July 14, 1931.  H. T. SCOTT  1,814,970
LUBRICATOR
Filed May 7, 1928
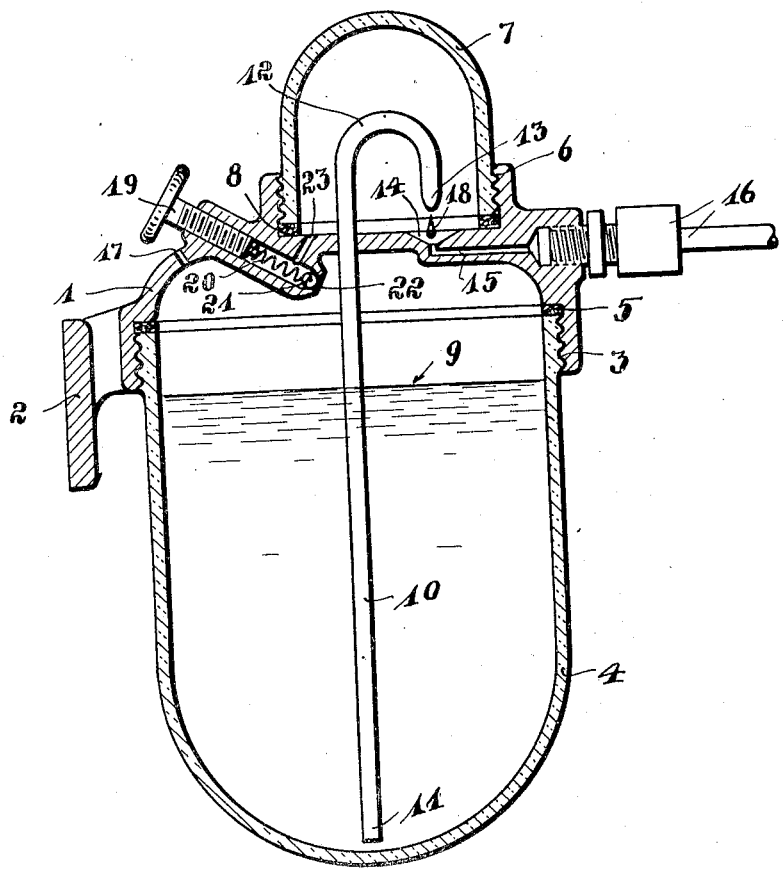
INVENTOR:
HARRY T. SCOTT,
By: Otto H. Ringer,
his Atty.

Patented July 14, 1931

1,814,970

UNITED STATES PATENT OFFICE

HARRY T. SCOTT, OF LOS ANGELES, CALIFORNIA, ASSIGNOR OF ONE-HALF TO WILLIAM H. DILKS, OF LOS ANGELES, CALIFORNIA

LUBRICATOR

Application filed May 7, 1928. Serial No. 275,824.

This invention relates to devices used for passing a lubricant to the inside working mechanism of an engine.

One of the objects of this invention is to provide a vacuum-actuated apparatus by which a lubricant is drawn from a supply source.

Another object is to provide a lubricant well of a transparent type connected to a vacuum-actuated passage whereby lubricant may be passed from the well to the inside of an engine.

Another object is to provide an air vent whereby the lubricant well can be controlled so that a desired amount of lubricant can be caused to drip into the vacuum-actuated passage.

Another object is to provide a vacuum-control whereby the amount of lubricant dripping can be adjusted.

Another object is to provide a simple device designed so that it may easily be cleaned and refilled during operation.

Another object is to provide a sturdy device of simple construction easily adaptable and applicable to devices that require a steady flow of a comparatively minimum amount of a lubricant.

Other objects will appear from the following description and appended claims as well as from the accompanying drawing, in which—

The figure illustrates a simple lubricant well with connections and controlling means to operate according to this invention.

Though the inside of an engine, as the cylinder and piston for instance, requires lubricating as well as the comparatively further outwardly located bearings, any lubricant reaching the cylinder, as a rule, will be wasted or at least partly discharged with the exhaust for which reason a lubricant is generally very sparingly passed into the cylinder of any engine.

More particularly in an internal combustion engine, the very conditions existing in such an engine make it imperative that not too much lubricant should reach the cylinder.

However, even in an internal combustion engine the upper rings, the upper part of the piston, the valve stem and even the valve seat require a certain amount of lubrication since the comparatively high temperature in such an internal combustion engine tends to make such parts of the engine dry to such an extent to cause an undue wear-off. Any lubricating, on the other hand, must be limited rather carefully since the proper operation of an internal combustion engine is, in fact, disadvantageously influenced by an unnecessary or surplus lubricant that is allowed to enter the combustion chamber.

The principal object of this invention is, therefore, to control the lubricant exceedingly closely to the absolute required amount of lubricant in the engine.

As illustrated, the base structure 1 is provided with a bracket 2 by which the whole device can be attached to any suitable part near the engine. On one side, which will preferably be the lower side of the structure, a comparatively large opening is provided with a threaded portion 3 to which a well 4 is engaged. A gasket 5 is placed between the base 1 and the well to provide a tight joint.

The opposite side, which is preferably the uppermost or top side of the device, is provided with a comparatively smaller opening, also provided with a threaded portion indicated at 6 to which a cup-like top 7 is secured. Another gasket 8 is inserted between this cup 7 and the base structure 1.

The well as well as the cup member are preferably of transparent material so that the proper operation of the device may well be observed through these parts. The well is preferably filled with a lubricant up to approximately the line indicated at 9. A tube 10 is disposed through the base structure extending with its lowermost end 11 to a point close to the bottom of the well 4. The upper portion 12 of the tube extending above the base member 1 is made in form of a turn-back with the discharging end 13 terminating closely above the inner top surface of the base member. This upper termination 13 of the tube 10 is disposed above a funnel-like opening 14 in the base member. From this funnel-like opening 14 a conduit 15 leads to a connection 16 which may be extended to any suitable part of an engine, which in an internal combustion engine would preferably be to the intake manifold of the engine so that the vacuum of the internal combustion engine would act upon this whole device.

The vacuum of the internal combustion engine tends to evacuate the upper cup 7 to a suitable degree to draw lubricant from the well 4 through the tube 10.

In order to supplant the lubricant that is drawn from the well 4, a comparatively small aperture 17 is provided in the base member 1 by which a corresponding amount of air may enter the well as the lubricant is drawn from the well.

For controlling the drawing of oil from the well so that eventually only a drop of oil, as indicated at 18, should discharge or drip from the termination 13 at comparatively long intervals, an adjustment is provided in the base member.

A screw 19 acts upon a spring 20 whereby a small ball 21 can be placed under various pressures against a comparatively small aperture 22. A communicating conduit 23 is provided between the aperture 22 and the cup 7.

With this arrangement a control is established between the eventual degree of vacuum existing in the internal combustion engine and through the connection 16 transmitted to the cup 7 on the one side, and the outside air through the aperture 17 on the other side. By putting the spring 20 under various tensions by means of the screw 19, air may be allowed to pass through the aperture 22 and further through the conduit 23 into the cup 7 to any desired and required amount to positively control the drawing of the lubricant from the well 4, so that a drop of lubricant may be caused to drip through the aperture 13 of the tube 10 at desired intervals to assure a proper lubrication of the inside parts of the internal combustion engine.

Having thus described my invention, I claim :

1. In a lubricator, a well portion for holding a lubricant, a cup portion having a connection by which lubricant may be drawn, a partition between the well and the cup portion including a passage whereby a lubricant may be drawn from the well to a point close above the said connection so that the lubricant may be caused to drip into the connection in proportion to the drawing force applied to the connection, means whereby air from the outside may be caused to supplant any lubricant drawn from the well portion, and an adjustable control whereby air may be passed in various amounts from the well to the cup portion.

2. In a lubricator, a base structure, a lubricant well tightly secured to the underside of the base structure, a cup tightly sealed to the upper side of the base structure, a communicating tube disposed through the base structure with one termination extending to a point close to the bottom of the well and with the other termination extending into the cup and being disposed close above the base structure, the base structure embodying a connection by which lubricant may be drawn through the base structure from the cup portion, the communicating passage from the connection terminating close below the second-named termination of the communicating tube, the base structure having furthermore a comparatively small aperture by which air can pass from the outside of the well, and an adjustable control including a passage from the well into the cup whereby air may pass from the well and thereby from the outside into the cup in such a manner that the drawing of lubricant from the well may be controlled by adjusting this passing of air through this adjustable control.

3. In a lubricator, a container having a comparatively small air-inlet, a vacuum cup having a connection to be applied to the vacuum producing intake line of an internal combustion engine, means to draw a lubricant from said container into the said cup, and adjustable controlling means for controlling the degree of vacuum in said cup through said container and through said air-inlet.

4. In a lubricator, a container having a comparatively small air-inlet, a vacuum cup having a connection to be applied to the vacuum producing intake line of an internal combustion engine, means to draw a lubricant from said container into said cup, and yieldable adjustable controlling means for controlling the degree of vacuum in said cup through said container and through said air-inlet.

In testimony that I claim the foregoing as my invention I have signed my name.

HARRY T. SCOTT.